Patented June 3, 1952

2,598,953

UNITED STATES PATENT OFFICE 2,598,953

SEPARATION OF ORGANIC ESTERS

Alfred W. Weitkamp, Whiting, and Norman J. Bowman, Gary, Ind., assignors to Standard Oil Company, Chicago, Ill., a corporation of Indiana No Drawing. Application September 30, 1948, Serial No. 52,122

9 Claims. (Cl. 260—499)

This invention relates to the separation of organic acids, and to the separation of organic-acid esters. More particularly, it relates to the segregation of various types of carboxylic-acid esters by selective adduct-formation with urea and to a method based thereon for the segregation of various types of organic acids. In one specific embodiment, our invention relates to the segregation and separation of straight-chain and monomethyl-branched aliphatic carboxylic acids from admixture with other organic acids.

Our invention is based on our discovery that urea forms solid adducts with certain monomethyl-branched esters, as hereinafter defined, whereas it does not form adducts with more highly branched esters. By use of this selective reaction, in combination with other process steps to be described more fully hereinafter, we are now able to segregate mixtures of organic acids into three fractions, consisting of (1) straight-chain aliphatic carboxylic acids, (2) monomethyl-branched aliphatic carboxylic acids, and (3) other organic acids.

According to the prior art, urea forms solid adducts with numerous straight-chain organic compounds, including hydrocarbons, alcohols, aldehydes, ketones, and n-alkanoic acids and their ethyl esters; and this reaction has been utilized for the separation of such straight-chain compounds from admixture with other organic compounds. We have observed, however, that the reaction of urea with alkanoic acids is not selective for the n-alkanoic acids. Instead, urea reacts indiscriminately with alkanoic acids in general, evolving heat and forming a hard cake, rather than the crystalline adduct ordinarily obtained with straight-chain organic compounds. The separation of organic acids by this technique is therefore not feasible.

We have now made the surprising discovery, which the prior art nowhere discloses or suggests, that the formation of solid urea adducts with carboxylic acid esters is a highly selective reaction, being dependent upon the extent and position of branching, the position of the characteristic carbonyloxy group, the length of the straight carbon chain or chains attached to the carbonyloxy group, and the nature of any other substituents in the ester molecule. It is known that urea adducts are formed with certain straight-chain ethyl esters, whereas adducts are not formed with esters of cyclic acids or with esters containing cyclic substituents in the molecule. We have now discovered that urea forms adducts with monomethyl-branched esters wherein the straight-chain terminal portion containing the characteristic carbonyloxy group

contains also a total of at least four methylene groups, whereas urea does not form adducts with more highly branched esters (that is, esters containing an ethyl branch or a higher hydrocarbon substituent, or more than one methyl branch), or with monomethyl-branched esters wherein the straight-chain terminal portion containing the carbonyloxy group comprises less than four methylene groups.

The urea-reactive class of monomethyl-branched esters may be represented by the generic skeletal formula

where R is a straight-chain aliphatic radical and E is a terminal straight-chain ester group having one of the following skeletal formulas:

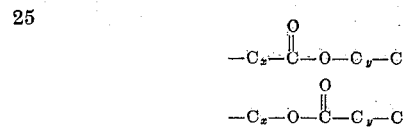

where $x$ and $y$ are zero or a positive integer, where the sum of $x$ and $y$ is at least four, and where $C_x$ and $C_y$ respectively represent straight carbon chains when $x$ or $y$ is greater than one. In the above formulas, the otherwise unsatisfied bonds of the carbon atoms are in general attached to hydrogen atoms, but we have further observed that the adduct-forming capacity of esters is substantially unaffected by the presence in the molecule of an olefinic double bond, and/or a hydroxyl group, and/or a fluorine atom.

On the basis of the foregoing observations, we have now devised a new process involving the selective reaction of urea with esters, by means of which we are able to effect the segregation and separation of straight-chain and monomethyl-branched aliphatic carboxylic acids from admixture with other organic acids. Mixtures of such acids and/or esters may be difficult or impossible to separate by conventional means, such as fractional distillation, fractional crystallization, and the like, owing to their close similarity of physical and chemical properties.

We have further discovered that the selective reaction of urea with esters, as defined herein, can be utilized in the separation of alcohols into groups according to the skeletal configuration thereof, as disclosed and claimed in our copending joint application, Serial No. 52,123, filed September 30, 1948, now Patent No. 2,594,481.

One object of our invention is to separate esters from one another and from other organic compounds. Another object of our invention is to segregate organic acids into generic types according to the configuration of the carbon skeletons. A further object of our invention is to purify organic acids and organic-acid esters. A still further object of our invention is to separate organic-acid fractions of special characteristics and high utility from complex mixtures thereof with other organic compounds. Other objects of our invention, and its advantages over the prior art, will be apparent from the following description, examples, and claims.

In a simple embodiment, our invention may be used to process a charging stock comprising a n-alkyl ester of a monomethyl-branched alkanoic acid having the following structural formula

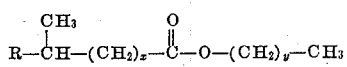

where R is n-alkyl, $x$ and $y$ are zero or a positive integer, and the sum of $x$ and $y$ is at least four. The charging stock is agitated with urea, preferably in the presence of a urea activator such as water, and the resulting slurry is filtered, centrifuged, or settled and decanted to separate the solid adduct therefrom. The adduct thus separated contains urea and the ester defined above; and if other urea-reactive substances such as straight-chain organic compounds containing six or more carbon atoms in the molecule, or free carboxylic acids, were absent from the charging stock, the adduct contains the urea-reactive ester in substantially pure form. The adduct may be washed with an inert organic liquid, such as a branched-chain, naphthenic, or aromatic hydrocarbon, having substantially no reactivity with or solvency for urea, in order to remove occluded mother liquor therefrom; and may thereafter be decomposed to liberate the desired ester.

In carrying out the above process, the charging stock may first be dissolved in an inert organic liquid, such as a branched-chain, naphthenic, or aromatic hydrocarbon. This is especially desirable where the charging stock is a viscous liquid or a solid. The quantity of urea required may be calculated on the basis of the quantity of adduct-forming ester in the charging stock. The molar ratio of urea to such ester is preferably at least equal to the total number of methylene groups in the ester group E, defined above, of the urea-reactive ester.

In the reaction mixture or in the urea may advantageously be incorporated a urea activator, preferably water, methanol, ethanol, acetone, propionaldehyde, or other lower aliphatic alcohol, lower aliphatic aldehyde, or lower aliphatic ketone. Other organic oxygenated compounds may also be used as urea activators, such as amyl acetate, ethyl ether, methyl n-amyl ketone, n-dodecyl alcohol, 2-ethyl-1-hexanol, 1-octanol, and the like; but they are not in general as effective as the preferred activators recited above. The molar ratio of activator to urea may range up to the quantity required to form a saturated solution of urea therein. Excellent results may be obtained, for example, within the range of about 0.05:1 to 1:1, but we prefer to operate between about 0.1:1 and 0.6:1. The reaction temperature is not critical, but should be high enough to maintain the charging stock in liquid form, and low enough to avoid melting and decomposing the urea adduct. Temperatures between about 0 and 90° C. are ordinarily satisfactory, but we prefer to operate between about 20 and 75° C. The time of contact between the urea and the charging stock is likewise not a critical variable. Adduct formation begins to take place almost instantaneously, and may be virtually complete in as little as 0.1 hour in some cases, especially when a urea activator is employed. We prefer in general to contact the reactants for a reaction period ranging from about 0.25 to 1.0 hour in order to insure substantially complete reaction between urea and ester.

Decomposition of the urea adduct and liberation of ester may be effected by dissolving the adduct in an excess of a urea solvent, such as water, methanol, ethanol, acetone, and the like, at a temperature above the melting point of the ester. We prefer to use water since the ester liberated thereby separates as a second phase from the resulting aqueous solution of urea. Alternatively, we may decompose the adduct by heating it to a temperature above its melting point, ordinarily around 125° C. The ester is liberated thereby as a separate phase, which may be withdrawn. Thereafter, the ester may be decomposed according to well-known procedures to regenerate the fatty-acid constituent thereof in purified form, or the ester may be subjected to radical interchange with an alcohol or an acid to produce a different ester species.

In another embodiment of our invention, we may contact urea with a charging stock containing a monomethyl-branched alkyl ester of a straight-chain aliphatic carboxylic acid having the structural formula

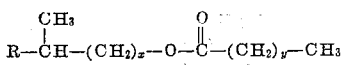

where R is n-alkyl, $x$ and $y$ are zero or a positive integer, and the sum of $x$ and $y$ is at least four, and separating from the resulting slurry a urea adduct containing said ester.

In another embodiment of our invention, we may contact a charging stock containing monomethyl-branched alkyl esters of a mixture of organic acids with urea, and separate therefrom a solid urea adduct containing the esters of the straight-chain aliphatic carboxylic acids having the following structural formula

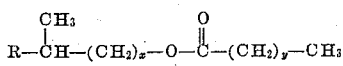

where R is n-alkyl, $x$ and $y$ are zero or a positive integer, and the sum of $x$ and $y$ is at least four. We may thereafter convert the esters in the depleted charging stock into n-alkyl esters, and again treat the charging stock with urea. Adducts are thereby formed containing esters of monomethyl-branched aliphatic carboxylic acids having the following structural formula

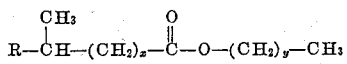

where R is n-alkyl, $x$ and $y$ are zero or a positive integer, and the sum of $x$ and $y$ is at least four. This adduct is separated, leaving behind any other types of esters originally contained in the charging stock.

In another embodiment of our invention, we may contact a charging stock containing n-alkyl esters of a mixture of organic acids with urea, and separate therefrom a solid urea adduct formed from the esters of the n-alkanoic acids contained therein having the structural formula

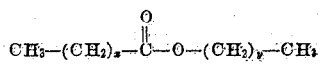

where $x$ and $y$ are zero or a positive integer, and the sum of $x$ and $y$ is at least four, and the esters of the monomethyl-branched n-alkanoic acids contained therein having the structural formula

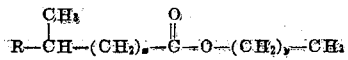

where R is n-alkyl, $x$ and $y$ are zero or a positive integer, and the sum of $x$ and $y$ is at least four, leaving behind any other types of esters originally contained in the charging stock. We may thereafter decompose the urea adduct to liberate the mixed esters, which may then be converted into monomethyl-branched alkyl esters and again treated with urea. Urea adducts are thereby formed containing n-alkanoic acid esters having the following structural formula

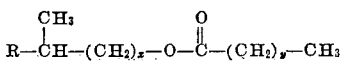

where R is n-alkyl, $x$ and $y$ are zero or a positive integer, and the sum of $x$ and $y$ is at least four. These adducts may be withdrawn, leaving behind the esters of the monomethyl-branched n-alkanoic acids.

It will be apparent that mixtures of organic acids may be processed according to the procedures described above simply by converting the acids first into the specified esters, containing aliphatic radicals of the desired configurations on each side of the carbonyloxy group. We may, for example, convert a mixture of organic acids into monomethyl-branched aliphatic esters such as isopropyl, isobutyl, isopentyl, 2-methylbutyl, 1-methyl-2-butenyl, isoheptyl, 1-methylheptyl, isotetradecyl, and isooctadecyl esters, and the like, by heating the mixture of acids with an alcohol affording a monomethyl-branched aliphatic radical, suitably a straight-chain 2-alkanol, straight-chain alkene-2-ol, monomethyl-branched 1-alkanol, or monomethyl-branched alkene-1-ol, in the presence of an acidic esterification catalyst such as sulfuric acid or toluenesulfonic acid, while removing the water of reaction as an azeotrope with the alcohol or with an entraining agent such as benzene, toluene, or the like. When the esterification is complete, the acidic catalyst may be removed by neutralization and water-washing, and the esters may be purified if desired by distillation to remove non-esterified constituents of the original charging stock. Thereafter, the mixture of esters may be treated with urea, the adduct separated, the depleted ester mixture converted into esters of an alcohol affording a straight-chain aliphatic radical, and again treated with urea, as set forth above.

It is to be distinctly understood that the term "monomethyl-branched aliphatic radical" includes radicals of the type derivable from secondary straight-chain aliphatic alcohols having the hydroxyl group in the 2 position. Such radicals have the skeletal configuration

where $C_x$ represents a straight carbon chain.

The following is an especially useful embodiment of our invention whereby margaric acid in substantially pure form may be prepared from straight-chain 1-cetene (normal 1-hexadecene). A charging stock containing straight-chain 1-cetene is reacted with carbon monoxide and hydrogen in the presence of a cobalt catalyst under Oxo-process conditions to produce a mixture of margaric aldehyde (n-heptadecyl aldehyde), alpha-methylhexadecyl aldehyde, and more highly branched aldehydes. This mixture is fractionally distilled to separate the mixed aldehydes therefrom, and the mixed aldehydes are converted to the corresponding carboxylic acids by mild oxidation, preferably by air-blowing at a temperature above about 60° C. The mixed acids are then converted to the isopropyl esters (or to other monomethyl-branched alkyl esters), suitably by esterification with isopropyl alcohol, and the mixed esters are contacted with urea and a urea activator as hereinbefore described. The urea and the isopropyl margarate form a solid adduct, which is withdrawn, washed, and decomposed to liberate the purified ester. The ester may thereafter be saponified to form margaric acid, or may advantageously be converted by ester interchange with glycerol into glycerol trimargarate, more commonly known as "intarvin," a synthetic fat that is highly useful as a partial or total replacement for naturally occurring fats in the diet of diabetics.

Our invention may also be employed to advantage for separating the fatty-acid components of various naturally occurring esters, waxes, fats, or the like, for example, degras, which contains n-alkanoic, isoalkanoic, and anteisoalkanoic acid esters. Similarly, our invention may be used to separate the mixtures of fatty acids obtained in the oxidation of hydrocarbons by various methods, and by the hydrogenation of carbon monoxide in the Fischer-Tropsch process and the numerous modifications thereof.

In general, our invention is useful for segregating mixtures of organic acids into the following three groups: (1) n-alkanoic acids, such as acetic, propionic, butyric, valeric, caproic, enanthic, caprylic, pelargonic, capric, lauric, myristic, palmitic, margaric, stearic, and lignoceric acids and the like; n-alkenoic acids, such as acrylic, crotonic, 4-pentenoic, 2-hexenoic, 2-heptenoic, 3-heptenoic, 4-heptenoic, 5-dodecenoic, and oleic acids, and the like; and the monohydroxy and monofluoro derivatives of such n-alkanoic and n-alkenoic acids; (2) isoalkanoic acids, such as isobutyric, isovaleric, isocaproic, isoheptanoic, 8-methylnonanoic, 12-methyltridecanoic, 16-methylheptadecanoic, and 26-methylheptacosanoic acids, and the like; anteisoalkanoic acids, such as 3-methylpentanoic, 6-methyloctanoic, 8-methyldecanoic, 12-methyltetradecanoic acids, and the like; other monomethyl-branched alkanoic acids, such as 2-methylpentanoic, 5-methylcapric, 2-methylmyristic and 2-methylpalmitic acids, and the like; and counterparts of the foregoing groups containing a single olefinic double bond, a single hydroxy group, and/or a single substituted fluorine atom; and (3) other organic acids.

Our invention will be more fully understood from the following specific examples. All of the quantities of materials used herein are set forth in terms of parts by weight.

*Example I*

A solution of 0.644 part of methyl myristate in 3.24 parts of neohexane was commingled with six parts of urea and 0.79 part of methanol, and the mixture was agitated at room temperature for one-half hour. The resulting slurry was filtered and the solid was washed with four successive portions of neohexane, each portion weighing 3.24 parts.

The filtrate and washings were combined and evaporated to dryness. Unreacted methyl myristate weighing 0.015 part was recovered thereby, amounting to only 2.3 percent of the material originally charged.

The washed solid was dried and dissolved in 20 parts of water, and the resulting solution was exhaustively extracted with ethyl ether. The ether solution was then evaporated to dryness, and 0.604 part of methyl myristate was recovered therefrom. Thus, it was shown that a urea adduct had been formed by 94.8 percent of the methyl myristate originally charged.

*Example II*

A neohexane solution containing 0.7850 part of isopropyl myristate was contacted with urea and methanol as described in Example I. From the urea adduct was recovered 0.687 part of the ester, corresponding to 87.5 percent of the charging stock. From the filtrate and washings was recovered 0.0731 part of ester, corresponding to 9.3 percent.

*Example III*

A neohexane solution containing 0.7355 part of 2-ethylhexyl myristate was contacted with urea and methanol as described in Example I. From the filtrate and washings 0.721 part of the ester was recovered, corresponding to 98.1 percent of the charging stock. Thus, not more than 1.9 percent of the charging stock formed an adduct with the urea.

*Example IV*

A solution of 0.5796 part methyl isopalmitate (methyl 14-methylpentadecanoate) in neohexane was contacted with urea and methanol as described in Example I. From the urea adduct was recovered 0.556 part of the ester, corresponding to 95.9 percent of the charging stock, whereas only 0.027 part of the ester was recovered from the filtrate and washings, corresponding to 4.6 percent.

*Example V*

A neohexane solution containing 0.762 part of methyl d-12-methyltetradecanoate was contacted with urea and methanol as described in Example I. The resulting urea adduct yielded, on being decomposed, 0.666 part of the ester, corresponding to 87.4 percent of the quantity originally charged.

*Example VI*

A neohexane solution containing 0.7415 part of isopropyl d-12-methyltetradecanoate was treated with urea and methanol as described in Example I. Only 0.0737 part of the ester was recovered from the urea adduct, corresponding to 10.0 percent of the charging stock. From the filtrate and washings was recovered 0.609 part of the ester, corresponding to 82.1 percent.

*Example VII*

A neohexane solution containing 0.267 part of methyl isopalmitate, 0.287 part of isopropyl myristate, and 0.278 part of methyl d-12-methyltetradecanoate was contacted with urea and methanol as described in Example I. From the resulting urea adduct was recovered 0.647 part of esters, corresponding to 77.7 percent of the esters originally charged. From the filtrate and washings was recovered 0.183 part of esters, corresponding to 22.0 percent.

*Example VIII*

A neohexane solution containing 0.7355 part of a mixture of methyl 10-phenylstearate and methyl 9-phenylstearate was contacted with urea and methanol as described in Example I. From the filtrate and washings was recovered 0.722 part of the esters, corresponding to 98.2 percent of the charging stock. Thus, not more than 1.8 percent of the charging stock was converted into the urea adduct.

*Example IX*

Calorimetric tests were conducted in a conventional manner to determine the heat of reaction of each of the following substances in isooctane solution with methanol-activated urea. The results were as follows:

| Compound | Heat of Reaction |
|---|---|
|  | k-cal./mole |
| 12-Methyl-1-tetradecanol | 2.86 |
| 12-Methyltetradecyl acetate | 7.7 |
| Methyl 12-methyltetradecanoate | 7.8 |

Thus, it is apparent that monomethyl-branched esters are much more reactive with urea than monomethyl-branched alcohols; and it is further apparent that the orientation of the carbonyloxy group is immaterial.

*Example X* n-Butyl n-butyrate formed an adduct of low stability when contacted with methanol-activated urea. n-Butyl isobutyrate failed to react with methanol-activated urea.

*Example XI*

Calorimetric tests were conducted in a conventional manner on the methyl and isopropyl esters of a group of saturated and monoolefinic fatty acids to compare their heats of reaction with methanol-activated urea. In each test, 6 parts of ester in 100 parts of solvent were contacted in the calorimeter with 120 parts of urea. When solvents other than methanol were used, 6 parts of methanol were incorporated in the reaction mixture to activate the urea. The results were as follows:

| Acid | Ester | Solvent | Heat of Reaction, $\Delta H$, k.-cal./mole | Total $CH_2$ Groups, $\Sigma CH_2$ | $\Delta H / \Sigma CH_2$, k.-cal./mole |
|---|---|---|---|---|---|
| Myristic | Methyl | Isooctane | 16.1 | 12 | 1.34 |
| Palmitic | do | do | 19.3 | 14 | 1.375 |
| Stearic | do | do | 22.2 | 16 | 1.39 |
| Oleic | do | Methanol | 15.1 | 14 | 1.08 |
| Do | do | Isooctane | 20.6 | 14 | 1.47 |
| Do | Isopropyl | do | 7.0 | 14 | 0.5 |
| Δ11-Eicosenoic | Methyl | do | 21.2 | 16 | 1.32 |
| Do | Isopropyl | do | 15.5 | 16 | 0.97 |
| Erucic | Methyl | do | 23.7 | 18 | 1.32 |
| Do | Isopropyl | do | 19.5 | 18 | 1.08 |

A number of the adducts obtained in the above tests were washed with isooctane to remove unreacted ester, and were then decomposed with water. The recovered esters were measured, and the heats of reaction were recalculated on the basis of the quantity of esters actually reacting with urea. The results were as follows:

| Acid | Ester | Ester from Adduct per cent | Heat of Reaction, ΔH | | Corrected ΔH/ΣCH₂, k.-cal./mole |
|---|---|---|---|---|---|
| | | | Uncorr., k.-cal./mole | Corr., k.-cal./mole | |
| Δ11-Eicosenoic | Methyl | 93.6 | 21.2 | 22.7 | 1.42 |
| Do | Isopropyl | 60.0 | 15.5 | 25.9 | 1.62 |
| Erucic | Methyl | 92.2 | 23.7 | 25.6 | 1.42 |
| Do | Isopropyl | 84.7 | 19.5 | 23.0 | 1.28 |

Thus, there appears to be no substantial difference between comparable methyl and isopropyl esters as to their heats of adduct formation. Instead, there appears to be an equilibrium in the urea-ester reaction that is somewhat less favorable toward adducts of isopropyl esters than toward adducts of corresponding methyl esters.

Example XII

A hydrocarbon phase, produced by hydrogenating carbon monoxide in the presence of a fluidized, alkali-promoted iron catalyst at approximately 600° F. and 250 pounds per square inch, was washed with dilute aqueous sodium hydroxide solution to remove the organic acids therefrom, and the organic acids were subsequently regenerated by sulfuric acid treatment and were separated from the aqueous extract. The resulting organic-acid phase was subsequently separated into a series of fractions by fractional distillation. The $C_{13}$–$C_{15}$ fraction obtained thereby was converted into the methyl esters, and a solution containing 0.782 part of the esters in neohexane was prepared, and was contacted with urea and methanol as described in Example I. From the resulting urea adduct, only 0.080 part of esters was recovered, corresponding to 10.2 percent of the materials originally charged to the urea treatment step, whereas 0.670 part of esters was recovered from the filtrate and washings, corresponding to 85.7 percent.

Example XIII

The $C_{19}$–$C_{23}$ fraction of the mixture of organic acids described in Example XII was converted into the methyl esters, and a neohexane solution containing 0.839 part of the methyl esters was treated with urea and methanol as described in Example I. From the resulting urea adduct was recovered only 0.055 part of the esters, corresponding to 6.5 percent of the esters charged. From the filtrate and washings was recovered 0.780 part of esters, corresponding to 93.0 percent.

Example XIV

Another portion of the $C_{19}$–$C_{23}$ acid fraction described in Example XIII was converted into the isopropyl esters, and a neohexane solution containing 1.061 parts of the isopropyl esters was contacted with urea and methanol as described in Example I. From the resulting urea adduct was recovered only 0.044 part of the esters, corresponding to 4.1 percent of the esters originally charged. The combined filtrate and washings yielded 0.988 part of the esters on being evaporated, corresponding to 93.1 percent.

While we have described our invention with reference to a number of specific embodiments thereof, it is to be understood that we are not limited to the charging stocks, manipulative steps, or process conditions employed therein. Our invention is to be construed broadly within the scope of the description and claims, and any modifications or equivalents that would ordinarily occur to those skilled in the art are to be considered as lying within the scope of our invention.

In accordance with the foregoing description, we claim as our invention:

1. A process for separating a monomethyl-branched aliphatic ester wherein the straight-chain terminal portion containing the characteristic carbonyloxy group

contains also a total of at least four methylene groups, from a mixture thereof with an organic compound which does not react with urea, which comprises contacting said mixture with urea, and withdrawing a solid adduct containing urea and said ester, substantially free from said urea-unreactive organic compound.

2. The process which comprises contacting urea with a monomethyl-branched aliphatic ester wherein the straight-chain terminal portion containing the characteristic carbonyloxy group

contains also a total of at least four methylene groups, whereby a solid adduct of urea and said ester is formed, and separating said adduct from the reaction mixture.

3. The process which comprises contacting urea and a urea solvent at a temperature between about 20 and 75° C. for a period in excess of around 0.1 hour with a monomethyl-branched aliphatic ester wherein the straight-chain terminal portion containing the characteristic carbonyloxy group contains also at least four methylene groups, the molar ratio of urea to said ester being at least equal to the number of said methylene groups, whereby a solid adduct of urea and said ester is formed, and separating said adduct from the reaction mixture.

4. In a process for separating a monomethyl-branched carboxylic acid from a mixture thereof with a more highly branched organic acid, the steps which comprise (1) esterifying said acids with a primary monohydric straight-chain alcohol of such a chain length that said monomethyl-branched carboxylic acid is converted into a monomethyl-branched aliphatic ester wherein the straight-chain terminal portion containing the characteristic carbonyloxy group contains also a total of at least four methylene groups, (2) contacting the esterified mixture with urea, (3) withdrawing a solid adduct containing urea and said monomethyl-branched ester, substantially free from ester of said more highly branched organic acid, (4) decomposing said adduct and recovering the ester contained therein, and (5) decomposing the recovered ester and recovering said monomethyl-branched carboxylic acid therefrom in purified form.

5. In a process for separating a mixture of organic acids containing a straight-chain and a branched-chain carboxylic acid, the steps which comprise (1) esterifying said acids with an alcohol affording a monomethyl-branched aliphatic radical of such a chain length that said straight-chain acid is converted into a monomethyl-branched aliphatic ester wherein the straight-chain terminal portion containing the characteristic carbonyloxy group contains also a total of at least four methylene groups, (2) contacting said esters with urea, (3) withdrawing a solid adduct containing urea and said monomethyl-branched ester, substantially free from ester of said branched-chain carboxylic acid, (4) decomposing said adduct and recovering the ester contained therein, and (5) decomposing the recovered ester and recovering said straight-chain carboxylic acid therefrom in purified form.

6. The process of claim 2 wherein said ester has the skeletal formula

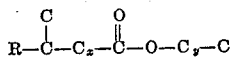

where R is a straight-chain aliphatic radical, where $x$ and $y$ are selected from the class consisting of zero and the positive integers, where the sum of $x$ and $y$ is at least four, where $C_x$ represents a straight carbon chain when $x$ is greater than one, where $C_y$ represents a straight carbon chain when $y$ is greater than one, where said ester contains not more than one olefinic double bond, not more than one hydroxyl group, and not more than one fluorine atom, and where otherwise unsatisfied bonds of the carbon atoms are attached to hydrogen atoms.

7. The process of claim 6 wherein said ester has the structural formula

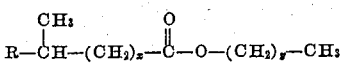

8. The process of claim 2 wherein said ester has the skeletal formula

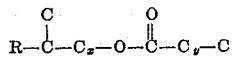

where R is a straight-chain aliphatic radical, where $x$ and $y$ are selected from the class consisting of zero and the positive integers, where the sum of $x$ and $y$ is at least four, where $C_x$ represents a straight carbon chain when $x$ is greater than one, where $C_y$ represents a straight carbon chain when $y$ is greater than one, where said ester contains not more than one olefinic double bond, not more than one hydroxyl group, and not more than one fluorine atom, and where otherwise unsatisfied bonds of the carbon atoms are attached to hydrogen atoms.

9. The process of claim 8 wherein said ester has the structural formula

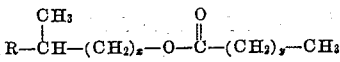

ALFRED W. WEITKAMP.
NORMAN J. BOWMAN.

REFERENCES CITED

The following references are of record in the file of this patent:

Bengen, Technical Oil Mission, Reel 143, frames 135–139, May 22, 1946.